(12) United States Patent
Liu et al.

(10) Patent No.: US 8,483,575 B2
(45) Date of Patent: Jul. 9, 2013

(54) APPARATUS AND METHOD FOR GENERATING FREQUENCY-LOCKED OPTICAL COMB SOURCES

(75) Inventors: Xiang Liu, Marlboro, NJ (US); Chandrasekhar Sethumadhavan, Old Bridge, NJ (US); Robert William Tkach, Little Silver, NJ (US)

(73) Assignee: Alcatel Lucent, Paris (FR)

( * ) Notice: Subject to any disclaimer, the term of this patent is extended or adjusted under 35 U.S.C. 154(b) by 270 days.

(21) Appl. No.: 12/685,470

(22) Filed: Jan. 11, 2010

(65) Prior Publication Data

US 2011/0170873 A1   Jul. 14, 2011

(51) Int. Cl.
*H04B 10/04* (2006.01)

(52) U.S. Cl.
USPC .................. 398/183; 398/187; 398/198

(58) Field of Classification Search
USPC .................................. 398/182–201
See application file for complete search history.

(56) References Cited

U.S. PATENT DOCUMENTS

| | | | | |
|---|---|---|---|---|
| 2004/0213351 A1* | 10/2004 | Shattil | | 375/260 |
| 2008/0095264 A1* | 4/2008 | Deng et al. | | 375/296 |
| 2008/0218862 A1* | 9/2008 | Kekas | | 359/573 |
| 2009/0067843 A1* | 3/2009 | Way et al. | | 398/79 |
| 2010/0178057 A1* | 7/2010 | Shieh | | 398/79 |

OTHER PUBLICATIONS

Tadhg Healy et al, "Multi-wavelength source using low drive-voltage amplitude modulators for optical communications," Opt. Express 15, 2981-2986 (2007).
S. Shimotsu et al, "Wideband frequency conversion with LINbO3 optical single-sideband modulator," OFC'01, paper WK-3.
Y. Ma et al, "1-Tb/s per channel coherent optical OFDM transmission with subwavelength bandwidth access," OFC'09, post-deadline paper PDPC1. OFC'09, paper PDPC1.

* cited by examiner

*Primary Examiner* — Dzung Tran
(74) *Attorney, Agent, or Firm* — D M. LaBruno; A. Ralston

(57) ABSTRACT

Frequency-locked optical comb sources are provided that utilize recirculating frequency shifting based on frequency conversion in a modulator, together with a filter. The filter may be a wavelength notch filter and include a plurality of notches. An example apparatus includes a coupler, an I/Q modulator, and a filter. A first input of the coupler receives a first input optical carrier having a first frequency, and a second input of the coupler re receives a set of frequency-shifted carriers from the filter. The input optical carrier may have a plurality of frequencies. The I/Q modulator shifts the frequency of a first output of the coupler. The filter filters modulated output from the I/Q modulator thereby limiting the frequency-shifted carriers to be within an optical bandwidth. A second output of the coupler provides a plurality of frequency-locked carriers containing the first input optical carrier and the set of frequency-shifted carriers.

21 Claims, 3 Drawing Sheets

APPARATUS AND METHOD FOR GENERATING FREQUENCY-LOCKED OPTICAL COMB SOURCES

FIELD OF THE INVENTION

The invention relates to optical transmission systems, and, in particular, to systems, apparatuses and techniques for generating frequency-locked optical comb sources.

BACKGROUND INFORMATION

To meet the ever-increasing demand on communication capacity, optical transmission systems are moving towards high channel data rate (e.g., Terabit/s/channel) and high spectral efficiency (SE). Multi-carrier modulation with carriers arranged under the orthogonal frequency-division multiplexing (OFDM) condition is a promising technique to support high data-rate transmission with high SE. To satisfy the OFDM condition, the carriers have to be frequency locked. There is thus a need for generating a frequency-locked optical comb source (FLOCS). It has been proposed to generate a FLOCS by using a laser followed by two optical modulators.

SUMMARY OF THE INFORMATION

The following presents a simplified summary of the disclosed subject matter in order to provide an understanding of some aspects of the disclosed subject matter. This summary is not an exhaustive overview of the disclosed subject matter and is not intended to identify key or critical elements of the disclosed subject matter not to delineate the scope of the disclosed subject matter. Its sole purpose is to present some concepts in a simplified form as a prelude to the more detailed description that is discussed later.

The limitations of current optical system elements present several obstacles for the development of future high channel data rate and high SE optical transmission systems. For example, a key component needed to satisfy the OFDM condition is a FLOCS. An existing method of generating a FLOCS is to use a laser followed by two optical modulators. However, there are at least three drawbacks to this existing methodology. First, the number of generated carriers is usually limited (to about 11). Second, the side-mode suppression ratio is not high (<13 dB). And third, the spectral flatness of the generated carriers is not high (~2 dB power ripple).

There is thus a need for generating a frequency-locked optical comb source (FLOCS) containing frequency-locked optical carriers with large spectral coverage, high spectral flatness, low noise, and high side-mode suppression ratio (SMSR). For dense wavelength-division multiplexing (DWDM) applications, it is also desired to simultaneously generate FLOCSs in multiple bands (MB-FLOCS), and do so in a cost-effective way.

Accordingly, apparatuses and methods are provided for generation of a single-band or multi-band FLCOS with high quality by using recirculating frequency shifting (RFS) based on frequency conversion in a single-sideband modulator (or I/Q modulator), together with a filter having at least one wavelength blocking (or rejection) band. The filter may be a wavelength notch filter having a narrow wavelength blocking band. The dispersion per round trip in the recirculating loop may be controlled so as to reduce crosstalk (or multipath interference) among the generated carriers. The phase delay per round trip in the recirculating loop may be stabilized so as to reduce the impact of the crosstalk.

In one example, an apparatus includes a coupler, a modulator, and a filter. A first input of the coupler is configured to receive a first input carrier having a first frequency, and a second input of the coupler is configured to receive a set of frequency-shifted carriers from the filter. The modulator is configured to shift the frequency of the first output of the coupler by shift frequency $f_s$. The filter configured to filter the output from the modulator thereby limiting the optical bandwidth of the frequency-shifted carriers. And, a second output of the coupler is configured to provide a plurality of frequency-locked carriers containing the first input carrier and the set of frequency-shifted carriers.

The filter may be a wavelength notch filter having at least one narrow wavelength blocking band. Preferably, the 3-dB bandwidth of the narrow wavelength blocking band is about the spacing between the frequency-shifted carriers, $f_s$.

In one embodiment, the apparatus further includes a multi-carrier generator, with the second output of the coupler provided to the multi-carrier generator so as to multiply the plurality of carriers. In an embodiment, the multi-carrier generator is a 2-carrier generator.

The coupler, the I/Q modulator, and the filter may be polarization-maintaining components in one embodiment. The I/Q modulator and the filter may be photonic integrated circuits in another embodiment. The apparatus may also include an optical amplifier configured to amplify the modulated output from the I/Q modulator to compensate for the loss due to the modulation, filtering, and coupling.

In one embodiment, the apparatus includes a modulator array, which is configured to generate high-speed (e.g., Tb/s) multi-carrier signal under the optical OFDM condition based on the plurality of frequency-locked carriers.

To reduce crosstalk among the generated carriers, the dispersion per round trip ($D_{RT}$) of the recirculating frequency shifter (RFS) formed by the coupler, the I/Q modulator and the filter may be controlled. In one embodiment, the dispersion per round trip $D_{RT}$ is about $\lambda/(8c\Delta\lambda)$, where c is the speed of light, $\lambda$ is the wavelength of the first input optical carrier, and $\Delta\lambda$ is the wavelength spacing of the frequency-locked carriers. The phase delay per round trip ($\phi_{RT}$) of the RFS may be stabilized to reduce crosstalk in one embodiment. For example, the phase delay per round trip $\phi_{RT}$ of the RFS may be stabilized to approximately zero.

One example method includes: at a frequency-locked optical comb source: coupling a first input optical carrier having an first frequency and a set of frequency-shifted carriers to generate a first coupled output and a second coupled output, frequency-shifting a first coupled output, and filtering the first coupled output that has been frequency-shifted to limit its optical bandwidth, wherein the second coupled output provides a plurality of frequency-locked carriers containing the first input optical carrier and the set of frequency-shifted carriers.

In one embodiment, the wavelength notch filter may have a plurality of notches. The first input optical carrier may have multiple frequencies. The wavelength notch filter may be an asymmetric interleaver. The wavelength notch filter may be based on a fiber Bragg grating (FBG) array.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein

FIG. 1b is an illustration of the passband of the wavelength notch filter and the generated frequency-locked carriers according to the example embodiment of FIG. 1a;

FIG. 2b is an illustration of the passband of the multi-band wavelength notch filter (MB-WNF) and the generated multiple (N) bands of carriers, each with M frequency-locked carriers, according to the example embodiment of FIG. 2a;

FIG. 3b is an illustration of the passband of the wavelength notch filter and the generated (2M) frequency-locked carriers according to the example embodiment of FIG. 3a.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein the description, the term "and" is used in both the conjunctive and disjunctive sense and includes any and all combinations of one or more of the associated listed items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1A:
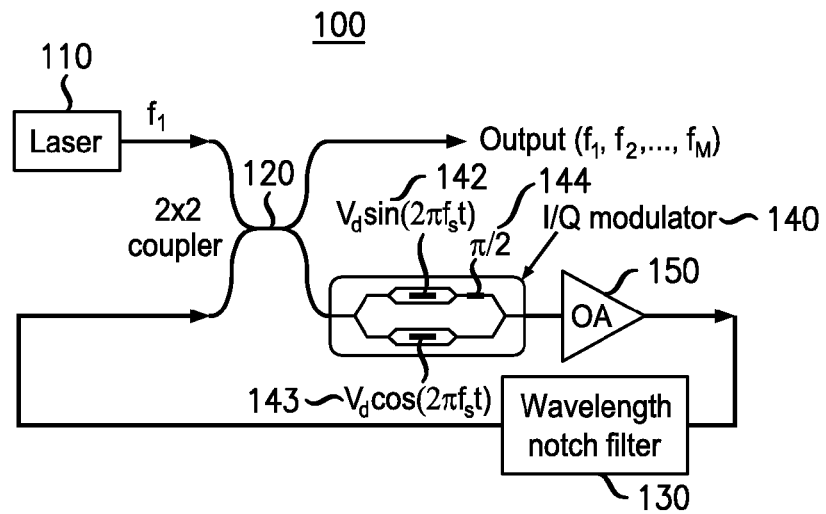
FIG. 1a is a schematic diagram of an example embodiment of a RFS-based FLOCS according to the principles of the invention.

FIG. 1a is a schematic diagram of an example embodiment of a recirculating frequency shifting (RFS) based frequency-locked optical comb source (FLOCS) according to the principles of the invention. The illustrated RFS-based FLOCS 100 generates a single band of frequency locked carriers. The FLOCS 100 receives an input optical carrier with a frequency of $f_1$ from laser 110. In one embodiment, the laser may be included in the FLOCS. The continuous wave light from the laser 110 is provided to the FLOCS and in particular to a first input of coupler 120. As illustrated, the coupler may be a 2×2 coupler. The second input of the coupler is provided with a set of frequency-shifted carriers from filter 130. As illustrated, the filter may be a wavelength notch filter 130.

A first output of the coupler is directed to modulator 140. Modulator 140 may be a single sideband modulator, an I/Q modulator and the like. Illustrated modulator is an I/Q modulator. Each branch of the I/Q modulator has modulation signal $V_d \sin(2\pi f_s t)$ 142, $V_d \cos(2\pi f_s t)$ 143 respectively, where $V_d$ is the maximum amplitude of the modulated signal and $f_s$ is the frequency of the drive signal, which also equals to the frequency shift between the input and the output of the modulator. One of the modulation branches also includes a phase shifter 144 to control the phase between the branches of the modulated signal.

The output of the I/Q modulator is provided to optional optical amplifier 150 which amplifies the modulated signal to compensate for loss during the modulation process. After amplification, the amplified signal is provided to the filter 130. As mentioned above the filter may be a wavelength notch filter that has at least one wavelength blocking band. When a steady-state is reached, the output from the filter includes optical carriers at $(f_2, f_3, \ldots f_M)$, where $f_m = f_{m-1} + f_s$ or $f_m = f_{m-1} - f_s$ (m=3, 4 ... M). The wavelength notch filter may be an asymmetric interleaver. The wavelength notch filter may be based on a fiber Bragg grating (FBG) array. In other embodiments, a wavelength selective switch (either MEM-based or LCOS-based), thin-film filters and the like may be used as the wavelength notch filter. From the filter, the frequency-shifted carriers are provided to the second input of the coupler.

The second output of the 2×2 coupler provides M frequency-locked optical carriers $(f_1, f_2, \ldots f_M)$, which is the output of the FLOCS in the illustrated example of FIG. 1.

The provided embodiments of a FLOCS are based on the understanding that the RFS is a unidirectional (in frequency) process and that only a narrow wavelength blocking band (or notch) is needed to terminate the RFS process, thereby leading to a well-defined FLOCS with high side-mode suppression ratio. The modulator 140, optional optical amplifier 150, wavelength notch filter 130 and coupler 120 form a recirculating frequency shifter and define a recirculating loop. The frequency location of the wavelength notch of the wavelength notch filter, together with the input laser frequency ($f_1$) determines the spectral bandwidth of the FLOCS. Since the frequency of the drive signal ($f_s$) determines the frequency spacing between adjacent carriers, the ratio between the spectral bandwidth of the FLOCS and the carrier spacing determines the number of the generated carriers (M).

Figure 1B:
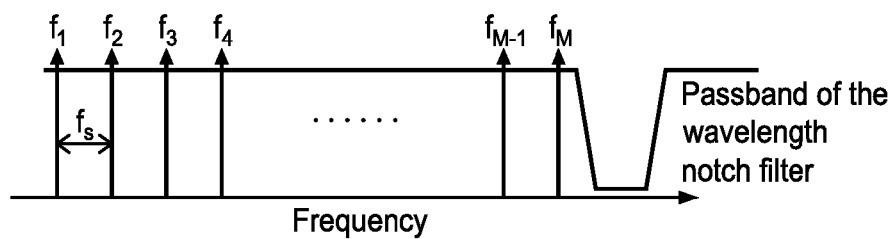

FIG. 1b is an illustration of the passband of the narrow wavelength notch filter and the generated frequency-locked carriers according to the example embodiment of FIG. 1a. As illustrated, based on the frequency of an input signal received by the FLOCS, a plurality of frequency-locked carriers ($f_1, f_2, f_3, f_4, \ldots f_{M-1}, f_M$) are generated. The frequency-locked carriers are spaced by the frequency of the drive signal $f_s$ of the modulator 140. The blocking band of the wavelength notch filter terminates the recirculating frequency shifting process thus ending carrier generation at a desired frequency band defined by the notch of the wavelength notch filter.

While the RFS concept has been used to make multiple copies of a modulated signal, it has not been utilized used to generate FLOCS. Also, the use of wavelength notch filter in the FLOCS is advantageous over the use of conventional optical bandpass filter. Compared to wavelength notch filters with narrow wavelength blocking bands, when an optical bandpass filter is used to confine the spectral bandwidth, there are at least two key drawbacks. First, the passband edges of an optical bandpass filter are not as sharp, so the side-mode suppression ratio (SMSR) is not as high. Note that the side modes cause undesirable coherent crosstalk in a dense wavelength-division multiplexing (DWDM) environment, so high SMSR is desired. Second, a bandpass filter only allows a single wavelength band to pass, thereby preventing the RFS to be used to generate multi-band FLOCS (MB-FLOCS) within the same setup.

Figure 2A:
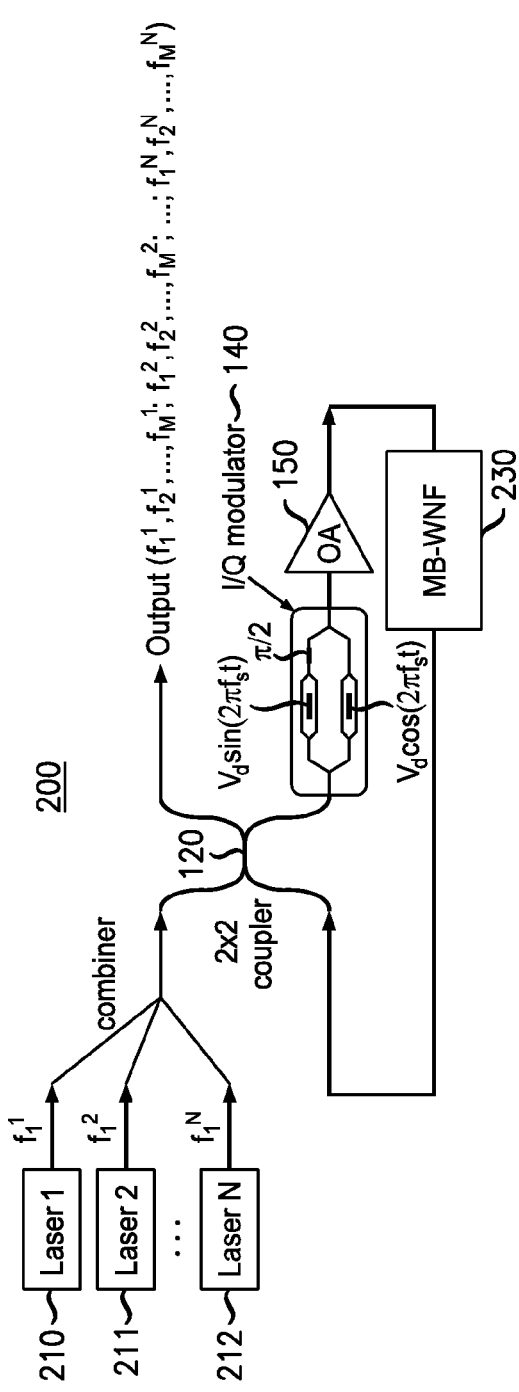
FIG. 2a is a schematic diagram of an example embodiment of a RFS-based Multi-Band FLOCS (MB-FLOCS) according to the principles of the invention.

FIG. 2a is a schematic diagram of an example embodiment of a RFS-based Multi-Band FLOCS (MB-FLOCS) according to the principles of the invention. The illustrated RFS-based MB-FLOCS 200 utilizes a multi-band wavelength notch filter (MB-WNF) 230, which has multiple narrow wavelength blocking bands, together with multiple CW laser sources 210, 211, 212 (or optical carrier having multiple frequencies) to generate MB-FLOCS suitable for DWDM transmission.

The illustrated RFS-based MB-FLOCS 200 generates multiple bands of frequency locked carriers. The MB-FLOCS 200 receives a multi-frequency input signal with a plurality of frequencies from combiner 219. Combiner combines a plurality of CW laser sources, each with a respective frequency of $f_1^1, f_1^2, \ldots f_1^N$, from a plurality of lasers 210, 211, 212, where N is the number of the CW laser sources. The multi-frequency input carrier is provided to the FLOCS and in particular to a first input of coupler 120. The second input of the coupler is provided with a frequency-shifted output from MB-WNF 230.

As in the example of FIG. 1, a first output of the coupler is directed to modulator 140. Modulator 140 may be a single sideband modulator, an I/Q modulator and the like. The output of the modulator is provided to optional optical amplifier 150 which amplifies the modulated signal to compensate for loss during the modulation process. After amplification, the amplified signal is provided to the MB-WNF 230. The MB-WNF has a plurality of notches that serve to terminate the RFS process for each of the respective carrier band. The MB-WNF may be an asymmetric interleaver, a fiber Bragg grating (FBG) array, a wavelength selective switch (either MEM-based or LCOS-based), thin-film filters, and the like. From the filter, the modulated signal is provided to the second input of the coupler.

The second output of the coupler provides (N) bands of carriers, each with M frequency-locked carriers $(f_1^1, f_2^1, \ldots f_M^1; f_1^2, f_2^2, \ldots f_M^2; \ldots f_1^N, f_2^N, \ldots f_M^N)$, which is the output of the FLOCS in the illustrated example of FIG. 2.

Figure 2B:
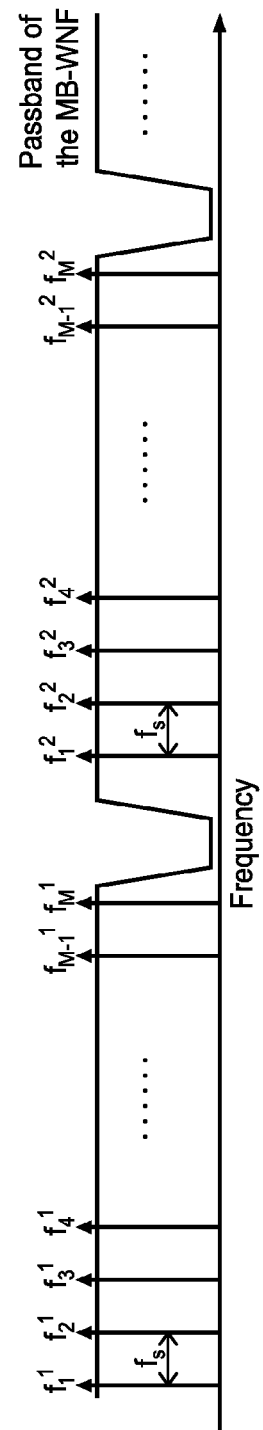

FIG. 2b is an illustration of the passband of the multi-band wavelength notch filter (MB-WNF) and the generated multiple (N) bands of carriers, each with M frequency-locked carriers, according to the example embodiment of FIG. 2a. Each notch of the wavelength notch filter terminates the RFS process for a respective carrier band.

Figure 3A:
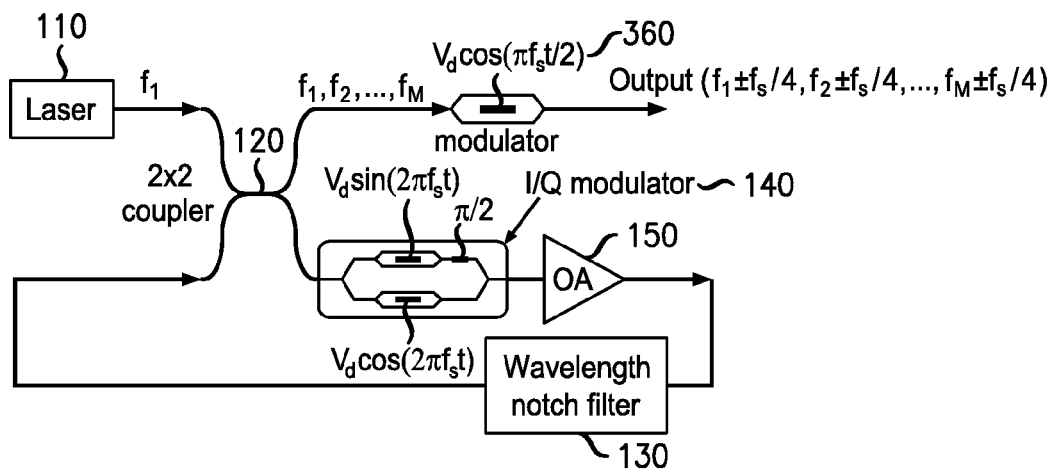
FIG. 3a is a schematic diagram of an example embodiment of a FLOCS based on the combined use of RFS and 2-carrier generation according to the principles of the invention.

FIG. 3a is a schematic diagram of an example embodiment of a FLOCS based on the combined use of RFS and two-carrier generation according to the principles of the invention. In the illustrated example, a RFS-based FLOCS is followed by a multi-carrier generator 360 (e.g., a Mach-Zehnder modulator biased at extinction and driven by a sinusoidal RF wave) to multiply the number of frequency-locked carriers. For example, multi-carrier generator 360 may be a 2-carrier generator so as to double the number of frequency-locked carriers. The frequency of the sinusoidal drive signal for the two-carrier generator is one-quarter (¼) of that for the I/Q modulator used for RFS. Thus, double the number of carrier are output by the 2-carrier generator, with the carriers output being located at the input carrier frequencies plus/minus one-quarter the drive frequency of the two-carrier generator. For the same number of output carriers, the combined use of the RFS-based FLOCS and the 2-carrier (or multi-carrier) generator greatly reduces the number of carriers needed to be generated by the RFS process. This architecture advantageously improves the quality of the FLOCS (by increasing the signal-to-noise ratio).

Figure 3B:
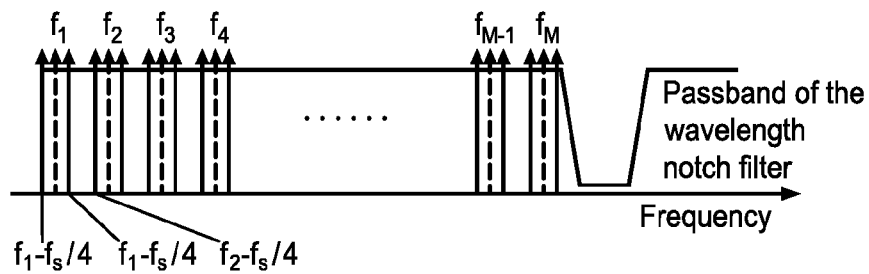

FIG. 3b is an illustration of the passband of the wavelength notch filter and the generated (2M) frequency-locked carriers according to an example embodiment of FIG. 3a. For FIG. 3b, the example embodiment includes a 2-carrier generator having a sinusoidal drive signal frequency one-quarter (¼) that of the I/Q modulator used for RFS, which results in carriers output by the two-carrier generator being located at the input carrier frequencies plus/minus one-quarter the drive frequency of the two-carrier generator. $(f_1 \pm f_S/4, f_2 \pm f_S/4, f_3 \pm f_S/4, \ldots f_M \pm f_S/4)$ Further embodiments of FLOCS according the principles described herein include, but are not limited to, (1) the use of polarization-maintaining components to maintain the polarization state of optical carriers traveling in the FLOCS; (2) the use of photonic integrated circuits (PIC) to realize frequency shifting, filtering, and/or amplifying; (3) the subsequent use of a modulator array to generate high-speed (e.g., Tb/s) multi-carrier signal under the optical OFDM condition based on the plurality of carriers provide by the FLOCS; (4) the subsequent coherent detection of one or more modulated carriers simultaneously per digital sampling; (5) transmission systems using the disclosed FLOCS source; (6) control of the dispersion per round trip ($D_{RT}$) of the recirculating frequency shifter (RFS) formed by the coupler to reduce crosstalk, the I/Q modulator and the filter; and (7) stabilization of the phase delay per round trip ($\phi_{RT}$) of the RFS to reduce the impact of crosstalk.

The embodiments provided herein will produce frequency-locked optical comb source (FLOCS) with improved quality (due to high SMSR) and easy management (due to its well-confined spectrum). Also, embodiments according to the principles described herein enable multi-band FLOCS with the same hardware as single band FLOCS, thereby leading to cost-saving in DWDM applications.

The following addresses crosstalk penalty specific RFS-based FLOCS embodiments which include control of the dispersion per round trip ($D_{RT}$) of the RFS and stabilization of the phase delay per round trip ($\phi_{RT}$) of the RFS.

Crosstalk occurs in RFS due to the generation of unwanted $3^{rd}$-order sidebands in the single-sideband (SSB)-modulation based frequency shifting process. The crosstalk components ($c_m$) can be normalized according to the signal components at their corresponding frequencies to obtain the following normalized crosstalk at frequency $f_m$ $$c_m = b\exp(j4\phi_{RT}) \sum_{n=1}^{m} \exp[j(n-1)\phi_{CD}] \quad n < (M-3) \quad (1)$$

$$= b\exp(j4\phi_{RT}) \sum_{n=1}^{M-3} \exp[j(n-1)\phi_{CD}] \quad n \geq (M-3)$$

where m is equals 1, 2 ... M, M is the number of frequency shifted carrier, b is the ratio between the $3^{rd}$ order frequency-shift term and the $1^{st}$ order frequency term, $\phi_{RT}$ is the phase delay per round trip (RT), and $\phi_{CD}$ is the phase delay per round trip due to chromatic dispersion (CD). Evidently, without considering dispersion ($\phi_{CD}=0$), the magnitude of the normalized crosstalk initially increases with m, reaches the maximum value of $|(M-3)b|$ at the $(M-3)$-th frequency, and remains at this maximum value for the last four frequencies.

Note that due to thermal fluctuation-induced path length changes in the RFS, $\phi_{RT}$ can be considered as a random variable within $[0, 2\pi]$.

When the dispersion in the RFS loop is considered, $\phi_{CD}=2\pi c(4\Delta\lambda D_{RT})/\lambda$, where c is the speed of light, $\lambda$ is the wavelength of the input optical carrier, and $\Delta\lambda$ is the wavelength spacing of between the generated carriers and $D_{RT}$ is the dispersion per round trip inside the RFS. The worst-case crosstalk occurs when $\phi_{CD}$ is a multiple of $2\pi$ (i.e., 0, $\pm 2\pi$, $\pm 4\pi$, $\pm 6\pi$, ... ), or when the multipath interference components add up constructively.

Through photonic integration, the RFS can be made very compact. If $\phi_{CD}$ is made to be about $\pi$, then the interferences would add up destructively, thereby minimizing the overall crosstalk penalty. To achieve this, the dispersion in the RFS loop should be arranged such that $D_{RT}\approx\lambda/(8c\Delta\lambda)$. In the case that other orders of sidebands (e.g., $2^{nd}$-order sidebands) are also present due to imperfect SSB modulation, the suitable arranged CD-induced phase delay can also avoid the worst-case (constructive) addition of the interference components.

For integrated RFS, it may also be possible to stabilize the phase delay of each round trip. By doing so, the crosstalk-induced power change per round trip can be fixed, and this fixed change can be compensated by varying the gain of the optical amplifier inside the RFS accordingly. In one embodiment, the phase delay per round trip $\phi_{RT}$ of the RFS may be stabilized to approximately zero.

A variety of the functions described above with respect to the exemplary method are readily carried out by special or general purpose digital information processing devices acting under appropriate instructions embodied, e.g., in software, firmware, or hardware programming. For example, functional modules of the FLOCS can be implemented as an ASIC (Application Specific Integrated Circuit) constructed with semiconductor technology and may also be implemented with FPGA (Field Programmable Gate Arrays), photonic integrated circuits (PIC) or any other suitable hardware blocks.

What is claimed is:

1. An apparatus comprising:
    a coupler;
    an I/Q modulator; and
    a wavelength notch filter that has at least one narrow wavelength blocking band;
    wherein a first input of the coupler is configured to receive at least a first input optical carrier having a first frequency, and wherein a second input of the coupler is configured to receive a set of frequency-shifted carriers from the filter;
    wherein the I/Q modulator is configured to shift the frequency of a first output of the coupler;
    wherein the filter is configured to filter shifted output from the I/Q modulator to limit the optical bandwidth of the set of frequency-shifted carriers;
    wherein a second output of the coupler is configured to provide a plurality of frequency-locked carriers containing the first input carrier and the set of frequency-shifted carriers, and
    wherein a 3-dB bandwidth of the at least one narrow wavelength blocking band is about equal to the spacing between the frequency-shifted carriers.

2. The apparatus of claim 1 wherein the wavelength notch filter is an asymmetric wavelength interleaver or a fiber Bragg grating (FBG) array.

3. The apparatus of claim 1 wherein the optical filter is a notch filter and the coupler is configured to receive a plurality of input optical carriers, the plurality of input optical carriers spaced by at least one blocking band of the optical filter.

4. The apparatus of claim 1 further comprising:
    a multi-carrier generator, the second output of the coupler provided to the multi-carrier generator.

5. The apparatus of claim 4 wherein the multi-carrier generator is a 2-carrier generator.

6. The apparatus of claim 1 wherein the coupler, the I/Q modulator, and the filter are polarization-maintaining components.

7. The apparatus of claim 1 wherein the I/Q modulator and the filter are photonic integrated circuits.

8. The apparatus of claim 1 further comprising:
    an optical amplifier configured to amplify the shifted output from the I/Q modulator.

9. The apparatus of claim 1 further comprising:
    a modulator array, wherein the modulator array is configured to generate multi-carrier signal under the optical OFDM condition based on the plurality of frequency-locked carriers.

10. The apparatus of claim 1 wherein the coupler, the I/Q modulator and the filter form a recirculating frequency shifter (RFS), and wherein dispersion per round trip ($D_{RT}$) of the RFS is controllable.

11. The apparatus of claim 10 wherein the dispersion per round trip $D_{RT}$ is about $\lambda/(8c\Delta\lambda)$, where c is the speed of light, $\lambda$ is the wavelength of the first input optical carrier, and $\lambda$ is the wavelength spacing of the frequency-locked carriers.

12. The apparatus of claim 1 wherein the coupler, the I/Q modulator and the filter form a recirculating frequency shifter (RFS), and wherein phase delay per round trip ($\phi_{RT}$) of the RFS is stabilized.

13. The apparatus of claim 12 wherein the phase delay per round trip $\phi_{RT}$ of the RFS is stabilized to approximately zero.

14. A method comprising:
    at a frequency-locked optical comb source:
    coupling at least a first input optical carrier having a first frequency and a set of frequency-shifted carriers to generate a first coupled output and a second coupled output;
    frequency-shifting the first coupled output; and
    filtering the first coupled output that has been frequency-shifted to limit its optical bandwidth to generate the set of frequency-shifted carriers, the filtering being performed by a wavelength notch filter that has at least one narrow wavelength blocking band,
    wherein the second coupled output provides a plurality of frequency-locked carriers containing the first input optical carrier and the set of frequency-shifted carriers; and
    wherein the 3-dB bandwidth of the narrow wavelength blocking band is about the spacing between the frequency-shifted carriers.

15. The method of claim 14 further comprising:
    multiplying the plurality of frequency-locked carriers using a multi-carrier generator.

16. The method of claim 14 wherein dispersion per round trip ($D_{RT}$) is controlled.

17. The method of claim 14 wherein phase delay per round trip ($\phi_{RT}$) is stabilized.

18. The method of claim 14 wherein the at least a first input optical carrier comprises a plurality of input optical carriers spaced by the at least one narrow wavelength blocking band.

19. An apparatus comprising:
    a coupler;
    an I/Q modulator; and
    a filter,
    wherein a first input of the coupler is configured to receive at least a first input optical carrier having a first frequency, and wherein a second input of the coupler is configured to receive a set of frequency-shifted carriers from the filter;

wherein the I/Q modulator is configured to shift the frequency of a first output of the coupler;

wherein the filter is configured to filter shifted output from the I/Q modulator to limit the optical bandwidth of the set of frequency-shifted carriers;

wherein a second output of the coupler is configured to provide a plurality of frequency-locked carriers containing the first input carrier and the set of frequency-shifted carriers; and wherein the coupler, the I/Q modulator and the filter form a recirculating frequency shifter (RFS), and wherein dispersion per round trip ($D_{RT}$) of the RFS is controllable.

20. An apparatus comprising:
a coupler;
an I/Q modulator; and
a filter,
wherein a first input of the coupler is configured to receive at least a first input optical carrier having a first frequency, and wherein a second input of the coupler is configured to receive a set of frequency-shifted carriers from the filter, wherein the I/Q modulator is configured to shift the frequency of a first output of the coupler, wherein the filter is configured to filter shifted output from the I/Q modulator to limit the optical bandwidth of the set of frequency-shifted carriers, wherein a second output of the coupler is configured to provide a plurality of frequency-locked carriers containing the first input carrier and the set of frequency-shifted carriers, and wherein the coupler, the I/Q modulator and the filter form a recirculating frequency shifter (RFS), and wherein phase delay per round trip ($\phi_{RT}$) of the RFS is stabilized to approximately zero.

21. A method comprising:
at a frequency-locked optical comb source:
coupling at least a first input optical carrier having a first frequency and a set of frequency-shifted carriers to generate a first coupled output and a second coupled output;
frequency-shifting the first coupled output;
filtering the first coupled output that has been frequency-shifted to limit its optical bandwidth to generate the set of frequency-shifted carriers,
wherein the second coupled output provides a plurality of frequency-locked carriers containing the first input optical carrier and the set of frequency-shifted carriers; and
wherein the coupling, frequency-shifting and filtering provide a recirculating frequency shifter (RFS), and wherein dispersion per round trip ($D_{RT}$) of the RFS is controllable.

* * * * *